July 5, 1932. C. H. PETSKEYES 1,865,950
COUPLING FOR SANDER DRUM SHAFTS
Filed May 28, 1930

INVENTOR.
Charles H. Petskeyes
BY James N. Ramsey
ATTORNEY.

Patented July 5, 1932

1,865,950

UNITED STATES PATENT OFFICE

CHARLES H. PETSKEYES, OF CINCINNATI, OHIO, ASSIGNOR TO THE J. A. FAY & EGAN COMPANY, OF CINCINNATI, OHIO, A CORPORATION OF WEST VIRGINIA

COUPLING FOR SANDER DRUM SHAFTS

Application filed May 28, 1930. Serial No 456,528.

This invention relates to an improved coupling for sander drum shafts of the type having a combined rotary and reciprocating motion.

The principal object of the invention is to provide, in such a coupling, a circular row of balls (or rollers) disposed between the teeth of the coupling members whereby the friction of the reciprocating motion between said members is reduced to a minimum and whereby said balls (or rollers) form a driving connection between the teeth of said coupling members for the rotary motion of said members.

Other objects and advantages of the invention will become apparent upon a full understanding of the construction, arrangement and operation of the coupling.

My invention consists in the construction, combination, location and arrangement of parts as set forth and claimed.

Figure 1:
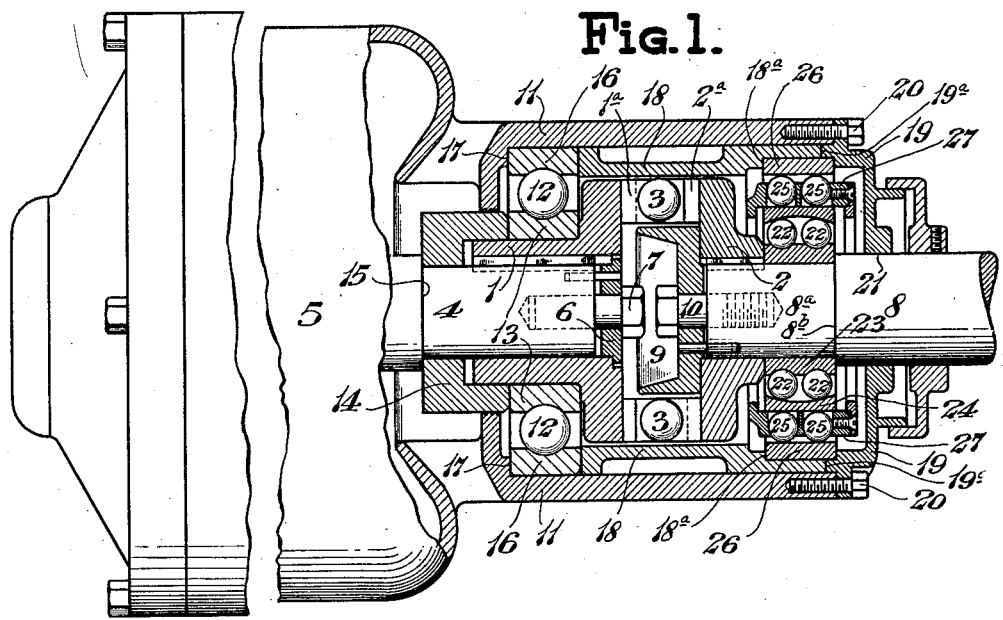
Fig. 1 is a sectional view through the coupling end of the motor housing, parts appearing in elevation.
Figure 2:
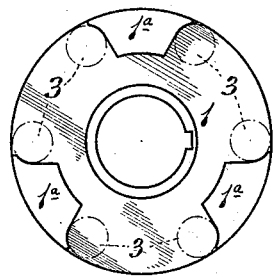
Fig. 2 is an end elevation of the motor shaft coupling member.
Figure 3:
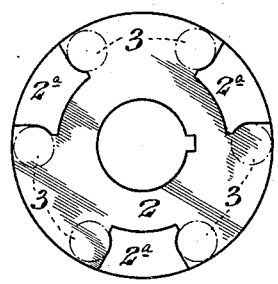
Fig. 3 is an end elevation of the sander drum shaft coupling member.

In the embodiment of my invention as illustrated and which shows a preferred construction I provide an improved coupling for sander drum shafts comprising coupling members 1 and 2 and balls 3. Coupling member 1 is keyed or otherwise fixed for rotation with motor shaft 4 of motor 5 and is retained upon said shaft as by retaining collar 6 and bolt 7 or other suitable or equivalent means. Coupling member 2 is likewise keyed or fixed for rotation with sander drum shaft 8 and is retained upon said shaft by retainer 9 and bolt 10 or other suitable means, as clearly shown in Fig. 1.

Coupling member 1 is rotatably supported within motor housing 11 by ball bearings 12, the inner race 13 of which is locked between said coupling member 1 and spacing member 14 by collar 6, bolt 7 and shoulder 15, the latter being formed upon the motor shaft 4. The outer race 16 of bearing 12 is held against annular shoulder 17 (formed within motor housing 11) by spacer 18 and said spacer is held against said outer race 16 by the end cover 19 of motor housing 11. This cover 19 is removably attached to motor housing 11 by bolts 20 and is provided with a central bore 21 to receive the sander drum shaft 8.

End 8a of sander drum shaft 8 is slightly reduced in diameter to provide shoulder 8b and is rotatably mounted upon the balls 22 within the motor housing 11. These balls 22, as shown in Fig. 1, are mounted between inner ball race 23 and intermediate ball race 24, the latter race being so cut as to make the balls 22 self-aligning. As sander drum shaft 8 is reciprocated, while it is being rotated (as is well-known to those skilled in the art of endless bed drum sanders) the balls 25 are provided to carry said reciprocating motion of the drum shaft. The sander drum shaft bearing forms no part of the present invention but is described briefly for the purpose of giving a better understanding of the improved coupling. Balls 25 are received between intermediate ball race 24 and outer ball race 26 and are held therebetween by retaining member 27. The outer ball race 26 is held between shoulders 18a and 19a of spacer 18 and cover 19, respectively.

Figure 4:
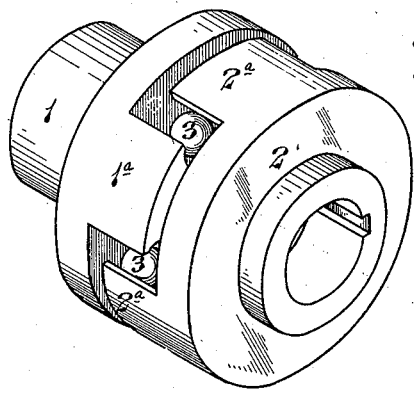
Fig. 4 is an isometric view of the coupling members showing some of the balls interposed therebetween.

In operation the coupling functions in the following manner:

When motor 5 is set into motion, motor shaft 4 is revolved and as the coupling member 1 is fixed thereto it likewise is revolved within ball bearings 12, carried by housing 11 as previously described. This rotary motion of the coupling member 1 is imparted to reciprocating coupling member 2 through the balls 3. As best shown in Fig. 4, the balls 3 are held between the teeth or jaws 1a and 2a of coupling members 1 and 2, respectively. With reciprocating coupling member 2 thus rotated by coupling member 1 through the balls 3 the sander drum shaft 8 will be rotated with said member 2 as it is fixed thereto, as before described. The mechanism for reciprocating the sander drum shaft 8 is not shown, but it operates in unison with the rotation of motor shaft 4 so that coupling member 2 is moved towards and from coupling member 1 while said couplings are rotating together by means of the balls 3. Thus it will be seen that the balls 3 serve a double purpose, i. e. they act as a driver between the teeth 1a and 2a of coupling members 1 and 2, respectively, and serve as a bearing to accommodate the longitudinal reciprocating motion of teeth 2a and thus reduce friction between the coupling members to a minimum.

My construction of coupling permits the shafts to be tilted at different angles relative to each other without any binding effect between the cooperating parts of the coupling. One feature of my invention is that centrifugal force urges the balls outwardly when the coupling is in motion, thereby locking the balls between their respective jaws or teeth; second, the balls being locked, because of the above, automatically hold the drum tight with the driving means, eliminating all backlash or lost motion because of wear; third, it permits of using one set or row of balls, and due to its construction we are able to align or adjust out of alignment the two connecting shafts and still maintain the predetermined efficiency.

While I have shown and described one form of the invention for the purpose of exemplification, it is to be understood that the invention is also susceptible of embodiment in other modified forms coming equally within the scope of the appended claims, as, for example, rollers, or other means, can be substituted in place of the balls 3.

What I claim as new and desire to secure by Letters Patent is:

1. A coupling for sander drum shafts comprising, in combination, a coupling member mounted for rotary motion, means for rotating said member, driving teeth on each member, the driving teeth on one member being undercut with the surface adjacent to the periphery curved and the remaining portion straight and the teeth of the other member being undercut with the portion adjacent to the periphery straight and the remaining portion curved, said teeth being spaced apart and having a circular row of anti-friction driving balls mounted within said undercut portion between the respective teeth of the cooperating coupling members, whereby as said coupling is rotated centrifugal force will tend to spread the balls outwardly from the center and against the curved portion of one tooth and the straight portion of the cooperating tooth, thus locking the teeth together and eliminating any backlash or lost motion while in operation and permitting reciprocating motion of the ball between said teeth.

2. A coupling for sander drum shafts comprising, in combination, a coupling member mounted for rotary motion, means for rotating said member, driving teeth on each member, the driving teeth on one member being undercut and the teeth of the other member having a cooperating straight portion, said teeth being spaced apart and having a circular row of anti-friction driving balls mounted between the respective teeth of the cooperating coupling members, whereby as said coupling is rotated centrifugal force will tend to spread the balls outwardly from the center and against the curved portion of one tooth and the straight portion of the cooperating tooth, thus locking the teeth together and eliminating any backlash or lost motion while in operation and permitting reciprocating motion of the ball between said teeth.

CHARLES H. PETSKEYES.